April 1, 1941. K. WIEMER 2,236,554
APPARATUS FOR PROCESSING CHOCOLATE
Original Filed Oct. 13, 1938
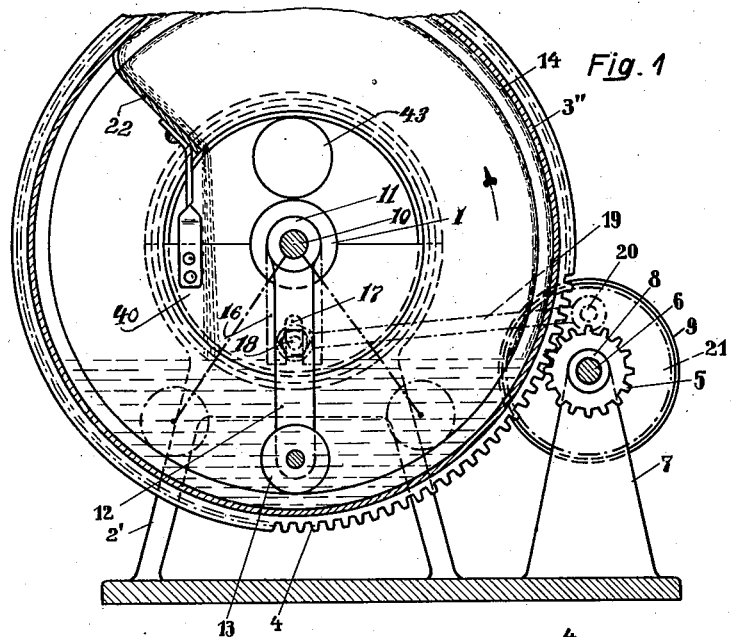
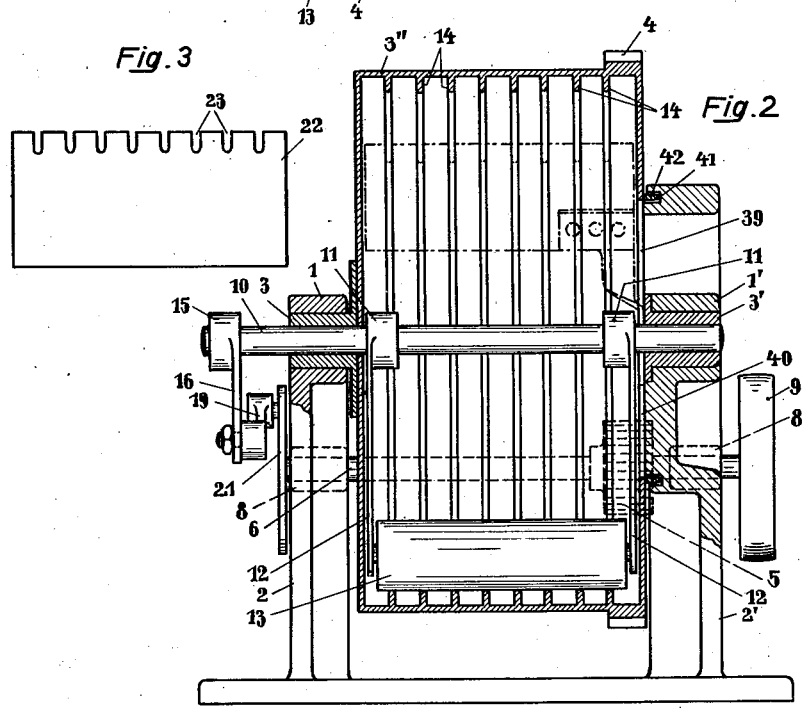

Patented Apr. 1, 1941

2,236,554

UNITED STATES PATENT OFFICE 2,236,554

APPARATUS FOR PROCESSING CHOCOLATE

Kurt Wiemer, Dresden, Germany, assignor to the firm J. M. Lehmann, Dresden, Germany Original application October 13, 1938, Serial No. 234,839. Divided and this application April 10, 1939, Serial No. 267,111. In Germany October 15, 1937

3 Claims. (Cl. 99—236)

This application is a division from my copending U. S. application, Serial No. 234,839, for "Processing chocolate," now filed October 13, 1938.

In the manufacture of goods made of chocolate a well prepared chocolate mass must be used. For one thing, the mass must have a sufficient degree of fineness, i. e. the parts which compose the mass (the broken cocoa beans, the sugar and the cocoa butter) must be in a finely ground state and well mixed. Secondly, the mass must show a very definite degree of liquidity (viscosity), in order to make possible orderly processing. Thirdly, the mass must be in the best possible state of taste refinement by corresponding development of the aromatic materials contained in the mass.

The comminution and refinement of the components of the mass (cocoa beans and sugar) is done in modern plants by special roller machines. After that, the material thus prepared is fed into the processing machine, e. g. a stirring machine, a roller vat, etc., with the addition of the necessary cocoa butter, and is brought there into the correct state of liquidity (viscosity) by stirring rods, rollers, etc.; at the same time a certain additional refinement takes place by grinding of the mass particles. While the mass is being stirred, rolled and kneaded, it comes into contact with the air, which, according to experience, leads to a development of the aromatic materials contained in the mass. It has been experienced that a surface of contact with the air, which is as great as possible, is useful in the safe and quick attainment of the highest refinement in the taste of the mass.

Stirring machines, roller vats, longitudinal rolling machines, and the like are conventionally kept in such dimensions as to take in a certain amount of the mass (e. g. 250 kg. or 500 kg.), and, within a certain time (e. g. 24 hours) to bring that mass to the required degree of viscosity, as necessary for the processing of the mass into chocolate goods. These machines can work properly only if a batch or charge of the quantity for which they are dimensioned is fed into them and is worked in them.

The mass, as said above, not only has to be brought to the proper degree of liquidity required for processing into chocolate goods, but it also must be so developed with regard to taste, that the best possible development of the aromatic materials contained therein takes place.

It has been demonstrated that the moment at which the mass has been brought to the correct degree of liquidity by the stirring machine, the roller vat, etc., does not at all coincide with the moment at which the aromatic materials have been so developed that the mass is in the best condition with regard to taste. The latter condition is reached much later than the moment at which the correct viscosity of the mass is reached. If the correct liquefaction is attained within 24 hours in a stirring machine, a roller vat, or the like, a multiple of that period is required to bring all mass particles sufficiently into contact with the air. The contact surface between mass and air is a fixed factor because of the fixed dimensions of these machines which always have been built for the quickest and most favorable liquefaction of a certain quantity of the mass.

If one desires to bring the mass, which is now in the machine and having the correct degree of liquidity, into still further contact with the air by stirring and rolling, in order to complete the taste development, then one would get a certain thickening of the mass because of the continuing comminution of the sugar contained therein. This has certain disadvantages for the processing into chocolate goods. Consequently one has contented oneself, heretofore, with an inadequate condition with regard to flavor development, or has accepted the thickening of the mass, or has used more butter to maintain the correct viscosity.

The object of the present invention is the construction of a processing machine, in which the moment at which the correct degree of liquefaction and comminution of the mass is reached, substantially coincides with the moment at which the mass has the best possible degree of refinement with regard to flavor.

This object is attained by a machine dimensioned for the processing of a certain quantity of mass (a stirring machine, a longitudinal friction machine, a roller vat, etc.), which is provided with means causing the mass to come into contact with the outside air continuously on a surface bearing a predetermined ratio to the amount of mass which the machine is designed to process, and amounting to at least 2 sq. m. per 100 kg.

It has been found that in using the conventional processing machines, within the same time in which the required viscosity of the mass is reached, the flavor refinement also can be brought to the maximum, if the machine is so built that the chocolate mass, during the time required for liquefaction, is spread over surfaces sufficiently large, so that the contact with the air takes place to a sufficient degree. These surfaces must amount to at least 2 sq. m. per 100 kg. of mass, according to these findings.

By abiding by this new formula there is effected safely and surely the coinciding of the moment of correct liquefaction of the mass with the moment of complete flavor development of the mass.

It is clear that in such a processing machine the mass can be made in a short time, namely in the time required for the liquefaction and comminution of the mass, into a perfectly flavored object.

The drawing represents one form of machine for carrying out the desired objects of the invention.

Fig. 1 shows in vertical cross section, and Fig. 2 shows in vertical longitudinal section one form of machine.

Fig. 3 is a side view of a scraper used in the form shown in Figs. 1 and 2.

In Figs. 1 and 2, numerals 1 and 1' designate the bearings of the bearing blocks 2 and 2', respectively. Numerals 3 and 3' show hollow shafts rotating in the bearings, to which shafts there is fastened a drum 3''. This drum is equipped at its periphery with teeth 4, which mesh with gear wheel 5. The wheel 5 is fastened to a shaft 6 which rotates in bearing 8 in the block 7 located adjacent bearing block 2. To the free end of shaft 6 there is fastened the pulley 9. The gear wheel 5 and the drum 3'' turn in the direction of the arrows.

Within the hollow shafts 3 and 3' there is placed an axle 10, to which there are fastened the half bearings 11 of two pendulum arms 12 extending downwardly in the interior of the drum. These pendulum arms carry the roller 13 which extends to the ribs 14 provided in the inner wall of the drum. The peripheral ribs 14 are arranged parallelly at equal distances from each other.

The axle 10 protrudes through bearing 1 outwardly where it carries the head 15 of a crank shaft 16. Into a slot 17 near the free end of the crank shaft protrudes a trunnion 18 which is fastened to the connecting rod 19. This connecting rod 19 is linked at 20 to a fly wheel 21 which is fastened to shaft 6 of gear wheel 5. Consequently the pendulum arms 12 are continuously oscillated in such a way that the roller 13 assumes the positions indicated in Fig. 1 by broken lines.

In the drum there is placed a quantity of chocolate mass commensurate to the output of the drum, for instance 500 kg. This mass is constantly revolved with simultaneous kneading by the back and forth movement of the roller 13. After a certain time (for instance after 24 hours) the mass has assumed the degree of comminution and liquidity suitable for further working by the kneading and rolling effect.

The mass thereby comes in contact with the air to a degree that is determined by the surface of the liquid mass. One of the side walls of the drum near the bearing of the drum axle is perforated at 39, in order that fresh air can get access to the interior, and gases from the inside can escape.

The bearing carries a stationary disc 40 which is equipped at the side facing the drum with a circular nut 41 in which engages a caulking flange 42, which is fastened to the side of the drum at the ring of the circular opening 39. The disc 40 covers the opening 39 except for an outlet 43 shown in Fig. 1, which consequently is permanently open. The mass can be fed in or taken out through opening 43, which also is useful in affording access to fresh air and escape for gases from the inside. If necessary, circulation of air can be brought about within the drum by a blower.

But in no case is the contact of the air with the mass sufficient to bring all the particles thereof into contact with the air to a sufficient degree and for a sufficient length of time to allow a complete development of the aromatic materials contained in the mass.

The material is carried by the wall of the drum and especially by the ribs 14 during the revolutions of the drum upwardly in the direction of the revolution of the drum. At an appropriate place there is a scraper 22 which is held in stationary position by an arm extending from disc 40 through opening 39, and which is equipped with slots 23 at the end facing the wall of the drum, as shown in Fig. 3, which fits the ribs 14. This scraper scrapes off the material adhering to the wall and the ribs; the matter will flow, consequently, down the scraper which is shaped as a slide obliquely directed downwardly. From the scraper the material flows down in a thin film and rejoins the mass processed by a roller 13.

The material carried upwardly in a thin film by the wall and ribs of the drum, is scraped off in a thin film by scraper 22 and is carried back in a thin film to the main supply of the mass. Consequently a great surface results which gives the mass particles repeated opportunity to get into contact with the air. This causes the full development of the aromatic materials contained in the mass within the same time in which the mass requires to be brought into the correct state of liquidity by kneading and rolling.

The dimensions are such that the entire surface of contact between mass and air (that is to say, the surface of the mass, the film on the wall and the ribs, and the down flowing film) amount to at least 2 sq. m. per 100 kg. of mass.

The foregoing detailed description is solely illustrative and not limitative in character it being intended to restrict the scope of the invention only by the terms of the appended claims.

I claim:

1. In an apparatus for processing chocolate, in combination a container for holding a quantity of chocolate; means for agitating said chocolate in the container; and means associated with said container for aerating said chocolate while being processed, said last named means being adapted to expose said chocolate continuously to air on a surface of at least 2 square meters for each 100 kilograms of chocolate in said container.

2. An apparatus according to claim 1, in which the container rotates around a horizontal axis, the inner surface of said container being provided with parallel ribs, and in which the agitating means comprises a roller abutting on the inner surface of said container.

3. An apparatus according to claim 1, in which the container rotates around a horizontal axis, the inner surface of said container being provided with parallel ribs, a stationary scraper touching said inner surface, whereby chocolate adhering to said inner surface is removed therefrom; and in which the agitating means comprises a roller abutting on the inner surface of said container.

KURT WIEMER.